(12) United States Patent
Miller

(10) Patent No.: US 12,591,102 B2
(45) Date of Patent: Mar. 31, 2026

(54) GUIDED AUTOFOCUS ASSEMBLY

(71) Applicant: Hutchinson Technology Incorporated, Hutchinson, MN (US)

(72) Inventor: Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 769 days.

(21) Appl. No.: 17/871,780

(22) Filed: Jul. 22, 2022

(65) Prior Publication Data

US 2022/0357544 A1    Nov. 10, 2022

Related U.S. Application Data

(63) Continuation-in-part of application No. 17/543,422, filed on Dec. 6, 2021, now Pat. No. 12,007,618, which is a continuation of application No. 17/189,034, filed on Mar. 1, 2021, now Pat. No. 11,194,115.

(60) Provisional application No. 63/073,782, filed on Sep. 2, 2020.

(51) Int. Cl.
*G02B 7/02* (2021.01)
*G02B 7/09* (2021.01)

(52) U.S. Cl.
CPC ................. *G02B 7/02* (2013.01); *G02B 7/09* (2013.01)

(58) Field of Classification Search
None
See application file for complete search history.

(56) References Cited

U.S. PATENT DOCUMENTS

| | | | |
|---|---|---|---|
| 5,539,491 | A | 7/1996 | Toshikatsu et al. |
| 5,862,015 | A | 1/1999 | Evans et al. |
| 5,883,759 | A | 3/1999 | Schulz |
| 5,946,163 | A | 8/1999 | Boutaghou et al. |
| 6,002,168 | A | 12/1999 | Bellaar et al. |
| 6,147,840 | A | 11/2000 | Khan |
| 6,823,582 | B1 | 11/2004 | Mostafazadeh et al. |
| 7,384,531 | B1 | 6/2008 | Peltoma et al. |

(Continued)

FOREIGN PATENT DOCUMENTS

| | | |
|---|---|---|
| CN | 1928612 A | 3/2007 |
| CN | 101416090 A | 4/2009 |

(Continued)

OTHER PUBLICATIONS

International Search Report and Written Opinion in International Application No. PCT/US2017/066864, mailed Mar. 5, 2018.

(Continued)

*Primary Examiner* — Brandi N Thomas
*Assistant Examiner* — Tamara Y. Washington
(74) *Attorney, Agent, or Firm* — DLA Piper LLP (US)

(57) ABSTRACT

A buckler wire actuator assembly is provided herein. The buckler wire actuator assembly includes at least one buckler frame mounted onto a base of the buckler wire actuator assembly and including at least one isolated electrical conductor. The buckler wire actuator assembly also includes a first SMA wire in electrical connection to one of the at least one isolated electrical conductor a second SMA wire opposite the first SMA wire. The first and second SMA wires are arranged in series to enable both the first and second SMA wires to receive equal current from a current input.

16 Claims, 14 Drawing Sheets

(56) References Cited

U.S. PATENT DOCUMENTS

| | | | |
|---|---|---|---|
| 7,388,733 B2 | 6/2008 | Swanson et al. | |
| 7,489,340 B2 | 2/2009 | Koo et al. | |
| 7,929,252 B1 | 4/2011 | Hentges et al. | |
| 8,144,430 B2 | 3/2012 | Hentges et al. | |
| 8,169,746 B1 | 5/2012 | Rice et al. | |
| 8,254,769 B2 | 8/2012 | Wu et al. | |
| 8,593,568 B2 | 11/2013 | Topliss et al. | |
| 8,736,988 B2 | 5/2014 | Cheng et al. | |
| 8,885,299 B1 | 11/2014 | Bennin et al. | |
| 8,941,951 B2 | 1/2015 | Bennin et al. | |
| 9,137,429 B2 * | 9/2015 | Topliss | H04N 23/57 |
| 9,175,671 B2 | 11/2015 | Howarth | |
| 9,366,879 B1 | 6/2016 | Miller | |
| 9,479,699 B2 | 10/2016 | Brown et al. | |
| 10,802,242 B2 | 10/2020 | Miller et al. | |
| 11,194,115 B1 | 12/2021 | Miller | |
| 11,199,182 B2 | 12/2021 | Miller et al. | |
| 12,007,618 B2 | 6/2024 | Miller | |
| 12,044,219 B2 | 7/2024 | Miller et al. | |
| 12,147,059 B2 | 11/2024 | Miller et al. | |
| 2002/0090749 A1 | 7/2002 | Simmons | |
| 2003/0006271 A1 | 1/2003 | Chen et al. | |
| 2004/0034724 A1 | 2/2004 | Bruner et al. | |
| 2004/0233581 A1 | 11/2004 | Poorman | |
| 2005/0093181 A1 | 5/2005 | Brandenburg et al. | |
| 2005/0206781 A1 | 9/2005 | Sawada | |
| 2005/0236708 A1 | 10/2005 | Farnworth et al. | |
| 2006/0017815 A1 | 1/2006 | Stavely et al. | |
| 2006/0018646 A1 | 1/2006 | Stavely | |
| 2006/0092514 A1 | 5/2006 | Koo et al. | |
| 2006/0150627 A1 | 7/2006 | Oohara | |
| 2006/0272328 A1 | 12/2006 | Hara et al. | |
| 2007/0279497 A1 | 12/2007 | Wada et al. | |
| 2008/0198249 A1 | 8/2008 | Tanimura et al. | |
| 2008/0237840 A1 | 10/2008 | Alcoe et al. | |
| 2008/0239576 A1 | 10/2008 | Higashi et al. | |
| 2008/0247748 A1 | 10/2008 | Tanimura et al. | |
| 2009/0103194 A1 | 4/2009 | Chen | |
| 2009/0244325 A1 | 10/2009 | Honjo et al. | |
| 2009/0303360 A1 | 12/2009 | Huang | |
| 2010/0283887 A1 | 11/2010 | Topliss et al. | |
| 2011/0120111 A1 | 5/2011 | Alexander et al. | |
| 2011/0199694 A1 * | 8/2011 | Kimoto | G02B 7/08 359/822 |
| 2012/0043116 A1 | 2/2012 | Kim et al. | |
| 2012/0224075 A1 | 9/2012 | Lim et al. | |
| 2013/0182176 A1 | 7/2013 | Honda | |
| 2014/0043496 A1 | 2/2014 | Azuma | |
| 2014/0104710 A1 | 4/2014 | Heo et al. | |
| 2015/0076929 A1 * | 3/2015 | Elenga | H02K 41/0356 310/12.22 |
| 2015/0113974 A1 | 4/2015 | Howarth | |
| 2015/0135703 A1 | 5/2015 | Eddington et al. | |
| 2015/0177477 A1 | 6/2015 | Hubert | |
| 2015/0304561 A1 | 10/2015 | Howarth et al. | |
| 2015/0346507 A1 | 12/2015 | Howarth | |
| 2015/0350500 A1 | 12/2015 | Gutierrez et al. | |
| 2015/0365568 A1 | 12/2015 | Topliss et al. | |
| 2016/0154250 A1 | 6/2016 | Miller | |
| 2016/0154251 A1 | 6/2016 | Ladwig et al. | |
| 2016/0219222 A1 | 7/2016 | Heo et al. | |
| 2016/0227088 A1 | 8/2016 | Brown et al. | |
| 2016/0238856 A1 | 8/2016 | Sul et al. | |
| 2016/0259177 A1 | 9/2016 | Ladwig et al. | |
| 2017/0080255 A1 | 3/2017 | Law et al. | |
| 2017/0118408 A1 | 4/2017 | Gregory et al. | |
| 2017/0261720 A1 | 9/2017 | Kang et al. | |
| 2018/0052299 A1 | 2/2018 | Miller et al. | |
| 2018/0171991 A1 | 6/2018 | Miller et al. | |
| 2018/0173081 A1 | 6/2018 | Kim et al. | |
| 2019/0136839 A1 | 5/2019 | Miller et al. | |
| 2020/0041872 A1 | 2/2020 | Kopfer | |
| 2020/0256322 A1 | 8/2020 | Miller et al. | |
| 2020/0362837 A1 | 11/2020 | Bunting et al. | |
| 2021/0223563 A1 | 7/2021 | Miller et al. | |
| 2021/0318509 A1 | 10/2021 | Jun | |
| 2022/0091356 A1 | 3/2022 | Miller | |
| 2022/0099072 A1 | 3/2022 | Miller et al. | |
| 2022/0128046 A1 | 4/2022 | Ruzicka et al. | |

FOREIGN PATENT DOCUMENTS

| | | | |
|---|---|---|---|
| CN | 103728819 A | 4/2014 | |
| CN | 104204935 A | 12/2014 | |
| CN | 104698721 A | 6/2015 | |
| CN | 107454742 A | 12/2017 | |
| CN | 110603487 A | 12/2017 | |
| CN | 207636905 U | 7/2018 | |
| CN | 216595833 U | 5/2022 | |
| EP | 1 153 774 A2 | 11/2001 | |
| EP | 2 813 877 A1 | 12/2014 | |
| GB | 1221306.2 | 11/2012 | |
| GB | 2569036 A | 6/2019 | |
| GB | 2570171 A | 7/2019 | |
| GB | 2569668 B | 5/2020 | |
| JP | 10-285475 A | 10/1998 | |
| JP | 11-337996 A | 12/1999 | |
| JP | 2001-222379 A | 8/2001 | |
| JP | 2006-31023 A | 2/2006 | |
| JP | 2006-33857 A | 2/2006 | |
| JP | 2008-203402 A | 9/2008 | |
| JP | 2009-282149 A | 12/2009 | |
| JP | 2010-268133 A | 11/2010 | |
| JP | 2012-502323 A | 1/2012 | |
| JP | 2014-010380 A | 1/2014 | |
| JP | 2014-154934 A | 8/2014 | |
| JP | 2015-518977 A | 7/2015 | |
| JP | 2015-537247 A | 12/2015 | |
| JP | 2017-207734 A | 11/2017 | |
| KR | 2012-0099945 A | 9/2012 | |
| KR | 2015-0053657 A | 5/2015 | |
| KR | 2015-0083250 A | 7/2015 | |
| TW | M548802 U | 9/2017 | |
| TW | 201907220 A | 2/2019 | |
| WO | WO 2010/089529 A1 | 8/2010 | |
| WO | WO 2013/118601 A1 | 8/2013 | |
| WO | WO 2013/121225 A1 | 8/2013 | |
| WO | WO 2013/175197 A1 | 11/2013 | |
| WO | WO 2014/038920 A1 | 3/2014 | |
| WO | WO 2014/083318 A1 | 6/2014 | |
| WO | WO 2015/104908 A1 | 7/2015 | |
| WO | WO 2019/243849 A1 | 12/2019 | |

OTHER PUBLICATIONS

International Preliminary Report on Patentability in International Application No. PCT/US2017/066864, mailed Jun. 27, 2019.
International Search Report and Written Opinion in International Application No. PCT/US2020/067584, mailed Mar. 23, 2021.
International Preliminary Report on Patentability in International Application No. PCT/US2020/067584, mailed Jul. 21, 2022.
Partial Supplementary European Search Report in European Application No. 17879841.9, dated Jun. 19, 2020.
Extended European Search Report in European Application No. 17879841.9, dated Nov. 9, 2020.
Examination Report in European Application No. 17879841.9, dated Sep. 5, 2022.
Office Action in Chinese Patent Application No. 201780077472.9, dated Jul. 20, 2020.
Office Action in Chinese Patent Application No. 201780077472.9, dated Apr. 9, 2021.
Office Action in Chinese Patent Application No. 201780077472.9, dated Sep. 13, 2021.
Office Action in Chinese Patent Application No. 201780077472.9, dated Mar. 1, 2022.
Notice of Granting Patent Right for Invention in Chinese Patent Application No. 201780077472.9, dated Aug. 12, 2022.
Notice of Reasons for Refusal in Japanese Patent Application No. 2019-532062, dated Nov. 16, 2021.
Notice of Reasons for Refusal in Japanese Patent Application No. 2019-532062, dated Sep. 20, 2022.

(56)                References Cited

OTHER PUBLICATIONS

Notice of Decision of Refusal in Japanese Patent Application No. 2019-532062, dated Jan. 24, 2023.
Notice of Preliminary Rejection in Korean Patent Application No. 10-2019-7019987, dated Apr. 13, 2022.
Notice of Allowance in Korean Patent Application No. 10-2019-7019987, dated Dec. 19, 2022.
Examination Report in United Kingdom Application No. 2209876.8, dated Jun. 5, 2023.
Office Action in U.S. Appl. No. 15/844,296, dated Nov. 7, 2018.
Office Action in U.S. Appl. No. 15/844,296, dated Jun. 6, 2019.
Office Action in U.S. Appl. No. 15/844,296, dated Nov. 20, 2019.
Office Action in U.S. Appl. No. 15/844,296, dated Mar. 12, 2020.
Office Action in U.S. Appl. No. 15/844,296, dated Aug. 25, 2020.
Office Action in U.S. Appl. No. 15/844,296, dated Feb. 22, 2021.
Notice of Allowance in U.S. Appl. No. 15/844,296, dated Jul. 30, 2021.
Office Action in U.S. Appl. No. 17/137,278, dated Jun. 17, 2021.
Office Action in U.S. Appl. No. 17/137,278, dated Sep. 30, 2021.
Office Action in U.S. Appl. No. 17/137,278, dated Apr. 15, 2022.
Office Action in U.S. Appl. No. 17/137,278, dated Sep. 6, 2022.
Notice of Allowance in U.S. Appl. No. 17/137,278, dated Oct. 25, 2022.
Office Action in U.S. Appl. No. 17/137,278, dated Mar. 3, 2023.
Office Action in U.S. Appl. No. 17/137,278, dated Jun. 29, 2023.
Office Action in U.S. Appl. No. 17/549,508, dated Oct. 20, 2022.
Office Action in U.S. Appl. No. 17/549,508, dated Mar. 31, 2023.
Office Action in U.S. Appl. No. 17/549,508, dated Jun. 29, 2023.
International Search Report and Written Opinion in International Application No. PCT/US2017/047931, mailed Oct. 27, 2017.
International Preliminary Report on Patentability in International Application No. PCT/US2017/047931, mailed Mar. 7, 2019.
Extended Search Report for European Patent Application No. 17844254.7 dated Mar. 3, 2020.
Office Action in U.S. Appl. No. 15/682,456, dated Nov. 9, 2018.
Office Action in U.S. Appl. No. 15/682,456, dated Jul. 25, 2019.
Office Action in U.S. Appl. No. 15/682,456, dated Jan. 23, 2020.
Notice of Allowance in U.S. Appl. No. 15/682,456, dated Jun. 12, 2020.

Combined Search and Examination Report in United Kingdom Application No. 2112407.8, dated May 4, 2022.
Examination Report in United Kingdom Application No. 2112407.8, dated Jul. 20, 2023.
Office Action in U.S. Appl. No. 17/189,034, dated May 21, 2021.
Notice of Allowance in U.S. Appl. No. 17/189,034, dated Aug. 9, 2021.
Office Action in U.S. Appl. No. 17/543,422, dated Aug. 14, 2023.
Notice of Preliminary Rejection in Korean Patent Application No. 10-2023-7007611, dated Nov. 8, 2023.
Office Action in U.S. Appl. No. 17/137,278, dated Nov. 28, 2023.
Office Action in U.S. Appl. No. 17/549,508, dated Nov. 28, 2023.
International Search Report and Written Opinion in International Application No. PCT/US2023/027692, mailed Oct. 6, 2023.
Notice of Allowance in U.S. Appl. No. 17/543,422, dated Feb. 22, 2024.
Examination Report in European Application No. 17879841.9, dated Mar. 26, 2024.
Notice of Reasons for Refusal in Japanese Patent Application No. 2019-532062, dated Jul. 23, 2024.
Office Action in Taiwan Patent Application No. 110100551, dated Sep. 5, 2024.
Notice of Reasons for Refusal in Japanese Patent Application No. 2023-085331, dated Aug. 6, 2024.
Notice of Allowance in Korean Patent Application No. 10-2023-7007611, dated Jun. 17, 2024.
Notice of Preliminary Rejection in Korean Patent Application No. 10-2023-7007611, dated Oct. 10, 2024.
Office Action in U.S. Appl. No. 17/137,278, dated Mar. 7, 2024.
Notice of Allowance in U.S. Appl. No. 17/137,278, dated Jul. 17, 2024.
Notice of Allowance in U.S. Appl. No. 17/549,508, dated Mar. 19, 2024.
Office Action in Chinese Patent Application No. 202110906579.8, dated May 1, 2025.
Notification of Reasons for Rejection in Japanese Patent Application No. 2021-138880, dated Jun. 3, 2025.
Office Action in Taiwan Patent Application No. 110132551, dated Mar. 11, 2025.

* cited by examiner

2030

GUIDED AUTOFOCUS ASSEMBLY

CROSS-REFERENCE TO RELATED APPLICATIONS

This application is a continuation-in-part of U.S. patent application Ser. No. 17/543,422, filed Dec. 6, 2021, which is a continuation of U.S. patent application Ser. No. 17/189, 034, filed Mar. 1, 2021, now U.S. Pat. No. 11,194,115, which claims the benefit of, and priority to, U.S. Provisional Application No. 63/073,782, filed on Sep. 2, 2020, each of which is hereby incorporated by reference in its entirety.

FIELD

Embodiments of the invention relate to the field of shape memory alloy systems. More particularly, embodiments of the invention relate to the field of shape memory allow actuators and methods related thereto.

BACKGROUND

Shape memory alloy ("SMA") systems have a moving assembly or structure that for example can be used in conjunction with a camera lens element as an auto-focusing drive. These systems may be enclosed by a structure such as a screening can. The moving assembly is supported for movement on a support assembly. The flexure element, which is formed from metal such as phosphor bronze or stainless steel, has a moving plate and flexures. The flexures extend between the moving plate and the stationary support assembly and function as springs to enable the movement of the moving assembly with respect to the stationary support assembly. The moving assembly and support assembly are coupled by four shape memory alloy (SMA) wires extending between the assemblies. Each of the SMA wires has one end attached to the support assembly, and an opposite end attached to the moving assembly. The suspension is actuated by applying electrical drive signals to the SMA wires. However, these types of systems are plagued by the complexity of the systems that result in bulky systems that require a large foot print and a large height clearance. Further, current systems fails to provide high Z-stroke range with a compact, low profile footprint.

SUMMARY

A buckler wire actuator assembly is provided herein. The buckler wire actuator assembly includes at least one buckler frame mounted onto a base of the buckler wire actuator assembly and including at least one isolated electrical conductor. The buckler wire actuator assembly also includes a first SMA wire in electrical connection to one of the at least one isolated electrical conductor a second SMA wire opposite the first SMA wire. The first and second SMA wires are arranged in series to enable both the first and second SMA wires to receive equal current from a current input.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
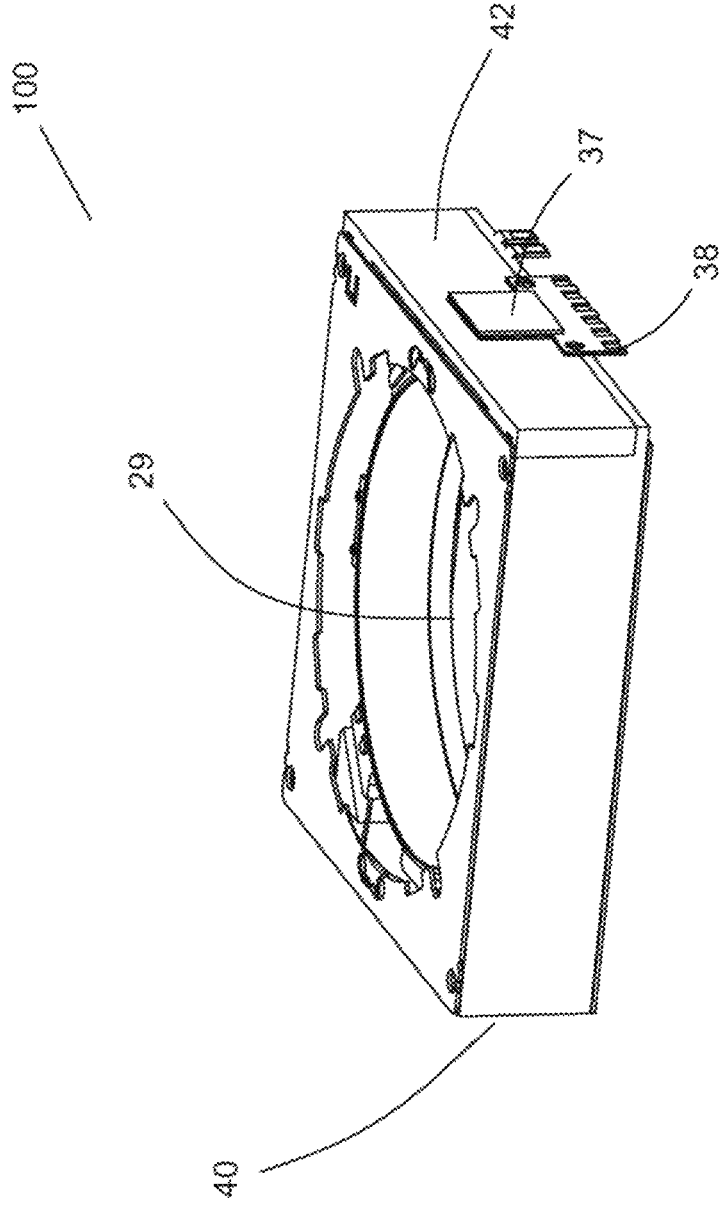
FIG. 1 illustrates a ball bearing autofocus assembly, according to an example of the disclosure.

Embodiments of a guided autofocus assembly are described herein that include a compact footprint and that enable a high actuation height, for example movement in the positive z-axis direction (z-direction), referred to herein as the z-stroke. FIG. 1 illustrates a guided autofocus assembly 100, according to an example of the disclosure. The assembly 100 includes an optical axis 29 configured to be aligned with an image sensor. The assembly 100 also includes a housing 40 and a hall housing wall 42. The assembly 100 includes a magnetic element 37 configured to be affixed to a flexible printed circuit board ("FPC") 38. The flexible printed circuit board is configured to be affixed to the hall housing wall 42. The magnetic element 37 is located relative to the hall sensor 36, as seen in FIG. 2, on a first side of the assembly 100 so that the hall sensor 36 is configured to indicate the position of a lens element along the optical axis 29.

Figure 2:
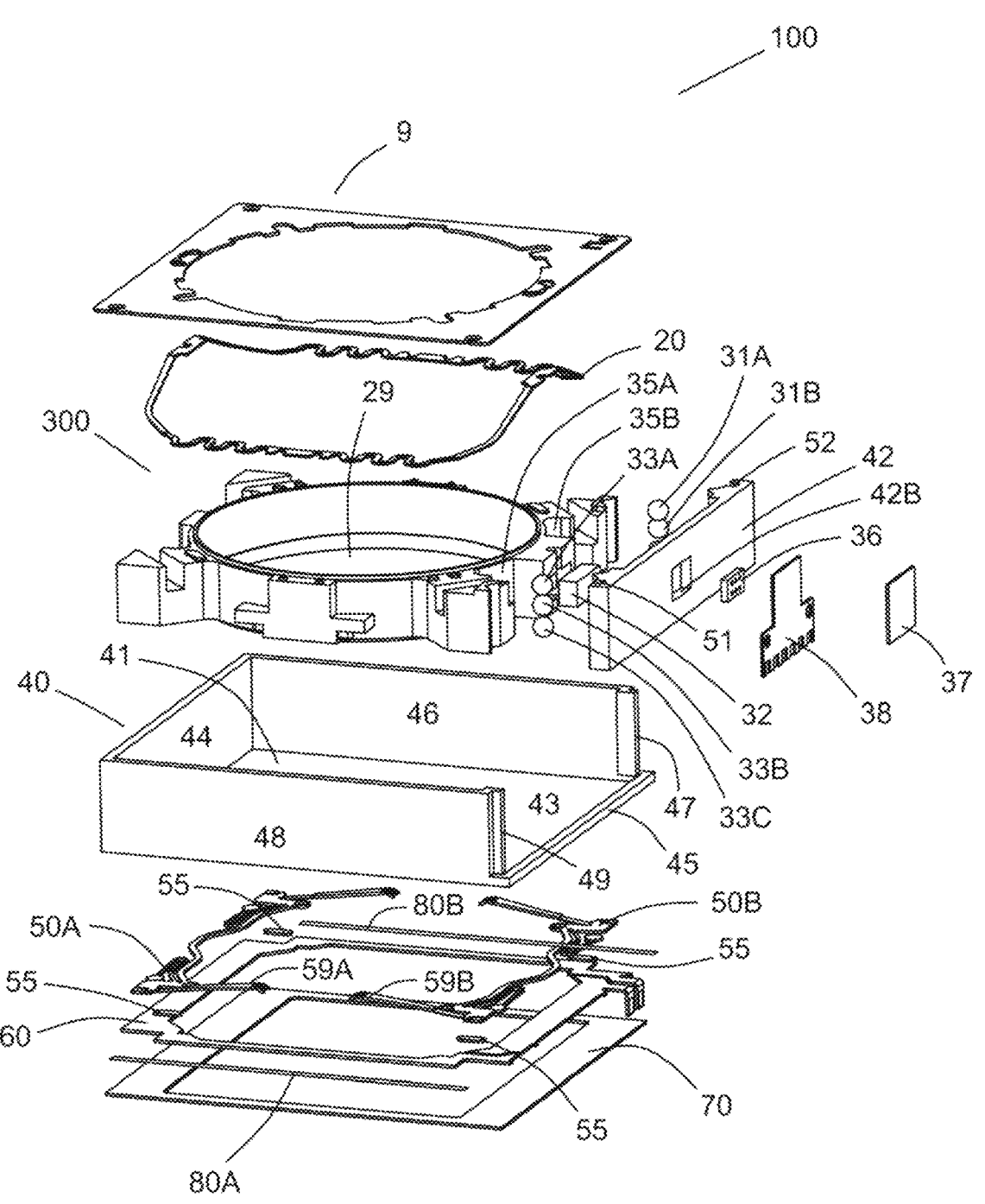
FIG. 2 illustrates an exploded view of the ball bearing buckle autofocus assembly of FIG. 1, according to an example of the disclosure.

FIG. 2 illustrates an exploded view of the guided autofocus assembly of FIG. 1, according to an example of the disclosure. The assembly 100 includes a cover 9, a spring element 20, a lens carriage 300, a housing element 40, a first buckler frame 50A, a second buckler frame 50B, SMA wires 80, a slide base 60, and an assembly base 70. The lens carriage 300 can be received within the housing element 40.

The cover 9 is configured to secure the spring element 20 to the lens carriage 300. The spring element 20 is configured to apply a force in the opposite direction to the z-stroke direction on the lens carriage 300, which according to some embodiments is in a direction parallel to the optical axis 29. The spring element 20 is configured, according to various embodiments, to move the lens carriage 300 in the opposite direction of the z-stroke direction when tension in the SMA wires 80A and 80B is lowered as the SMA wires are de-actuated. The spring element 20, according to some embodiments, is made from stainless steel.

The housing 40 includes a center wall 44, a first adjacent wall 46, a second adjacent wall 48, and an open face 43 opposite the center wall 44. The housing 40 also defines a receiving space 41. The receiving space 41 is configured to receive the lens carriage 300. The housing 40 also includes a hall housing wall 42. The hall housing wall 42 is configured to secure one or more ball bearings, a hall magnet 32, and a hall sensor 36. The hall magnet 32 is secured to the lens carriage 300. The hall sensor 36 is secured within an aperture 42B in the hall housing wall 42 according to some embodiments.

While ball bearings are illustrated herein, the bearings may be replaced by any of the following types of bearing elements including, but not limited to: jewel bearing; fluid bearing; magnetic bearing; flexure bearing; composite bearing; and polyoxymethylene ("POM") sliding bearing. Further, the ball bearings may also be replaced by a rocker or pivot bearing, where the bearing element pivots or rocks on the moving and static elements.

A magnetic element 37 is disposed at the hall housing wall 42 to magnetically attract the hall magnet 32. In some examples, the magnetic element 37 is affixed to the flexible printed circuit board 38 using adhesive. For some embodiments, the flexible printed circuit board 38 is affixed to the hall housing wall 42 using adhesive. The hall housing wall 42 is configured to secure the elements, such as the ball bearings and the hall magnet 32 between the hall housing wall 42 and the lens carriage 300. The hall sensor 36 is configured to determine the amount of movement the lens carriage 300 moves in the z-direction along the optical axis 29 from an initial position based on a distance that the hall magnet 32 is from the hall sensor 36. According to some embodiments, the hall sensor 36 is electrically coupled with a controller or a processor on the FPC 38.

The controller or processor implemented in the FPC 38 generates the drive signals and supplies them to the SMA wire 80 to which it is connected. The controller or processor also receives an input signal representing a desired position for the lens carriage 300 along the optical axis 29 and generates drive signals to drive the lens carriage 300 to the desired position. The drive signals may be generated using closed-loop control based on the output of the hall sensor 36 which senses the position of the lens carriage 300 along the optical axis 29.

In some examples, receiving spaces 35 are formed between the hall housing wall 42 and the lens carriage 300. Each of the receiving spaces 35 are configured to receive one or more ball bearing. For example, a first receiving space 35A includes ball bearings 31A, 31B, and 31C. Likewise, a second receiving space 35B includes ball bearings 33A, 33B, and 33C. The hall housing wall 42 of the lens carriage 300 also includes a receiving space for the hall magnet 32, positioned between the first and second receiving spaces 35A, 35B according to some embodiments.

The end of the first adjacent wall 46 at the open face 43 includes an engagement feature 47. Likewise, the end of the second adjacent wall 48 at the open face 43 includes an engagement feature 49. The housing 40 also includes a base engagement feature 45 that is between the first adjacent wall 46 and the second adjacent wall 48 at the open face 43. Other embodiments include a housing element 40 that does not include an engagement feature 45. The hall housing wall 42 includes an engagement feature 52 at a first end and a second engagement feature 51 at a second end opposite the first end.

The engagement feature 52 of the hall housing wall 42 is configured to couple with the engagement feature 47 of the housing 40. Likewise, the engagement feature 51 of the hall housing wall 42 is configured to couple with the engagement feature 49 of the housing 40. The hall housing wall 42 is configured to be secured to the base engagement feature 45.

First and second buckler frames 50A, 50B are configured to engage the lens carriage 300. This is discussed in greater detail below, with respect to FIG. 3. The first and second buckler frames 50A, 50B are secured to the slide base 60. The slide base 60 may be formed of metal, such as stainless steel, using techniques including those know in the art. However, one skilled in the art would understand that other materials could be used to form the slide base 60.

Further, the first buckler frame 50A includes buckler arms 59A coupled to the slide base 60. Similarly, the second buckler frame 50B includes buckler arms 59B coupled to the slide base 60. The slide base 60 can include slide bearings 55 configured to minimize any friction between the slide base 60 and a buckler arms 59A, 59B. According to various examples of the disclosure, the slide bearings 55 may be formed of polyoxymethylene ("POM"). One skilled in the art would understand that other structures could be used to lower any friction between the buckle actuator and the base, such as slide bearings made out of metal such as bronze. The slide base 60 is configured to couple with an assembly base 70 such as an autofocus base for an autofocus assembly.

Figure 3:
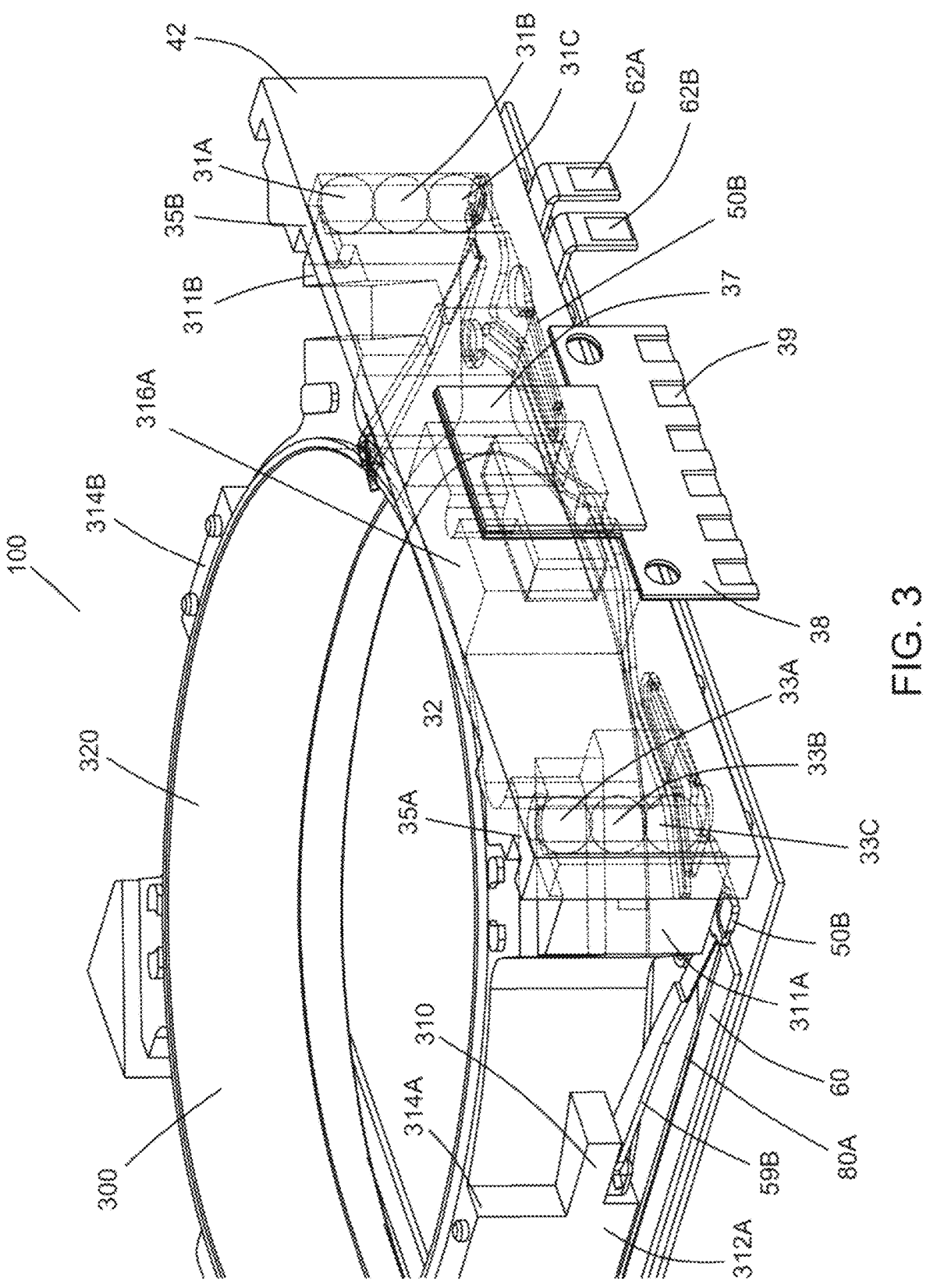
FIG. 3 illustrates configuration of the ball bearings of the ball bearing buckle autofocus assembly, according to an example of the disclosure.

FIG. 3 illustrates the configuration of the one or more ball bearings of the assembly 100, according to an example of the disclosure. The lens carriage 300 includes a circular frame 320. The circular frame 320 includes a first lateral protruding element 314A and a second lateral protruding element 314B. The first and second lateral protruding elements 314A, 314B each include a respective surface 312 aligned with a corresponding section of the first and second lateral walls 46, 48, respectively, of the housing 40 (shown in FIG. 2). The first lateral protruding element 314A, according to some embodiments, also includes a pair of engagement elements 310. Only one engagement element 310 is illustrated, but it should be understood by one of ordinary skill in the art that a second engagement element 314B extends in the opposite direction of the engagement element 310.

The lens carriage 300 is also configured to be disposed on the buckler frames 50A and 50B. The buckle frames 50A and 50B are attached to a slide base 60. Some examples include a slide base 60 split to electrically isolate the two sides, as one side is typically used for as a ground and the other side is power. Other embodiments include, include a slide base 60 with the two sides are electrically coupled to each other.

The buckler frames 50A and 50B include buckle arms 59A and 59B, respectively. Each buckle arm of the buckle arm pairs 59A and 59B are formed on a separate portion of its respective buckler frame 50A and 50B.

The buckle arms 59A and 59B are configured to move in the z-axis when the SMA wires are actuated and de-actuated, as described herein. The buckle arms 59A and 59B are configured to engage the engagement element 310 of the lens carriage 300. In some examples, the buckle arms 59A and 59B can be configured to engage with other elements of the lens carriage 300. For example, the buckle arms 59A and 59B may be coupled with each other through a center portion such as a hammock portion, which is configured to cradle a portion of an object (e.g., lens carriage 300). According to these embodiments, the buckle arms 59A and 59B are configured to act on an object to move it. For example, the buckle arms are configured to act directly on features of a lens carriage 300 to push it upward.

The circular frame 320 also includes corner elements 311. While two corner elements are illustrated herein, it should be apparent to one of ordinary skill in the art that the circular frame 320 includes two additional corner elements 311 at the opposite end of the lens carriage 300. The four corner elements 311 are configured to center the lens carriage 300 within the housing 40 and along the optical axis 29.

The lens carriage 300 includes a first housing element 316A, configured to secure the hall magnet 32. The FPC 38 is also located at the first end of the lens carriage 300. The magnetic element 37 is configured such that the hall magnet 32 draws the lens carriage 300 toward the magnetic element 37, effectively securing the one or more ball bearings in between the hall housing wall 42 and the lens carriage 300 within the receiving spaces 35. The FPC 38 includes multiple contact pads 39. The contact pads 39 may be gold plated stainless-steel pads, configured to power one or more components of the ball bearing autofocus assembly. The hall housing wall 42 is mechanically coupled to the ball bearings 33, enabling an actuation process for moving the ball bearings in a z-direction along the optical axis. The first end of the lens carriage 300 also includes the receiving spaces 35A and 35B formed between the lens carriage 300 and the hall housing wall 42.

The receiving spaces 35A and 35B may be formed as a triangle. In some examples, the hall housing wall 42 includes a first surface and the corner element 311A includes a V-shaped groove, configured to complete the shape of the triangle. In other examples, the hall housing wall 42 includes a first surface including a V-shaped groove and the corner element 311A includes a V-shaped groove aligned with the V-shaped groove of the first surface. The receiving spaces

35A and 35B may be lubricated, in some examples, to enable a low friction environment for the ball bearings. For example, the receiving space 35A may be lubricated to enable low friction rotation and displacement of the ball bearings 33A, 33B, and 33C. Likewise, the receiving space 35B may be lubricated to allow for the rotation and displacement of the ball bearings 31A, 31B, and 31C.

Furthermore, the lubrication provides a low surface roughness in order to minimize friction and improve dynamic tilt. In some examples of the disclosure, the hall housing wall 42 and the lens carriage 300 (and consequently the corner elements) are made of plastic. Forming the receiving spaces 35A and 35B of plastic and lubricating the interior surfaces of the receiving spaces 35A and 35B gives a smooth surface on which the balls can run and allows the desired dynamic tilt performance to be achieved.

The location of the ball bearings 31A-C and 33A-C relative to the location where the lengths of SMA actuator wires 80 apply force to the lens carriage 300 assists in constraining against rotation about an axis normal to a plane containing the optical axis 29. This is because the coupling between the forces applied by the lengths of SMA actuator wires 80 and by the ball bearings 31A-C and 33A-C is reduced, compared to the bearings 31A-C and 33A-C being located further away. This effect is improved by the number of ball bearings, which increases the length of the ball bearings along the optical axis 29. Thus, the embodiments of the guide bearing autofocus assembly has better performance over the current state of autofocus assemblies resulting in a more efficient assembly that improves picture quality.

The slide base 60 includes contact pads 62A and 62B. The contact pads 62A and 62B may be gold plated stainless-steel pads, configured to power the SMA wires 80. This is discussed in greater detail below, with respect to FIGS. 4 and 5.

Figure 4:
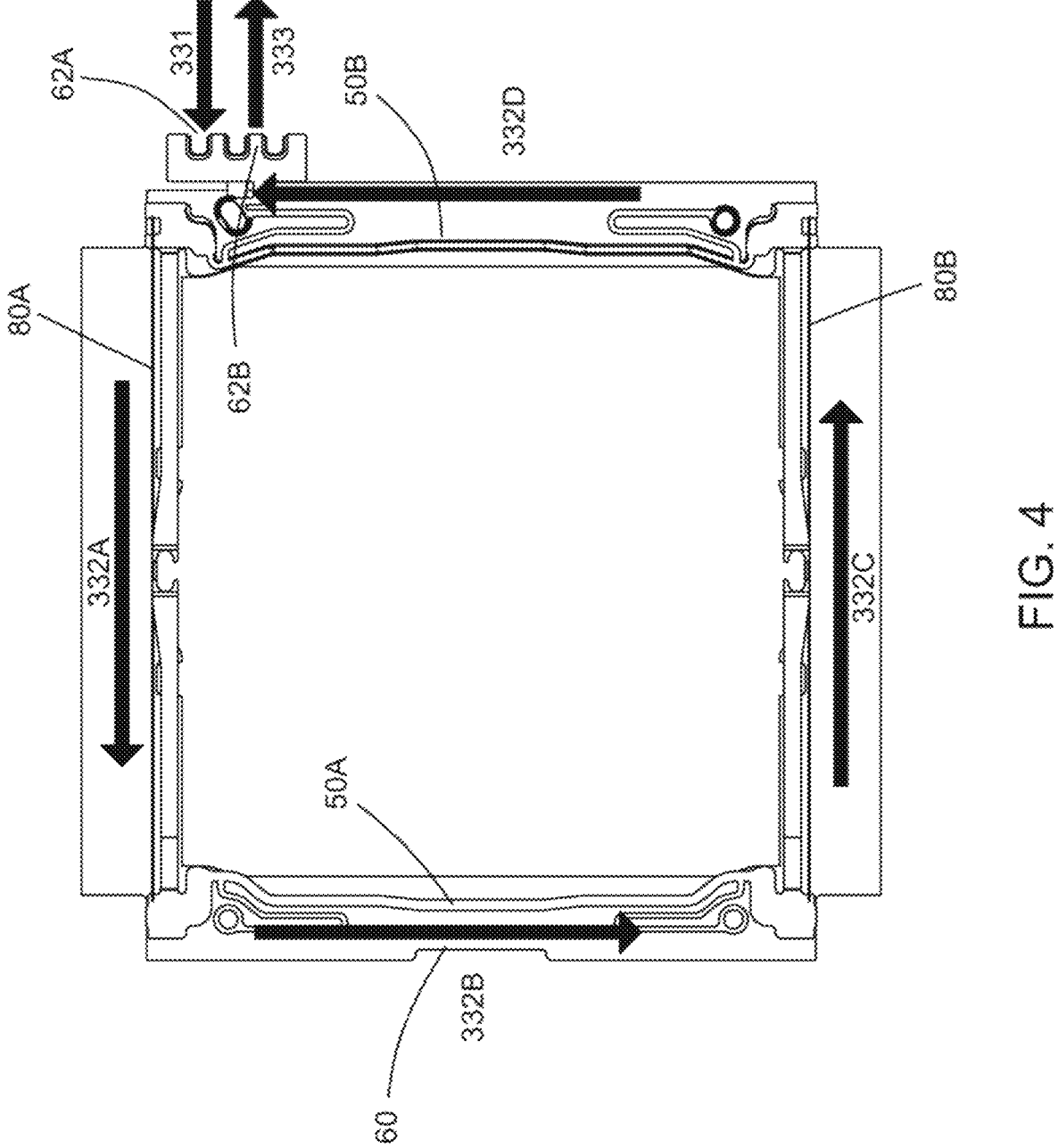
FIG. 4 illustrates a circuit design of the SMA wires of the ball bearing buckle autofocus assembly, according to an example of the disclosure.

FIG. 4 illustrates an exemplary circuit design of the SMA wires 80A and 80B of the assembly 100, according to an example of the disclosure. The SMA wires 80A and 80B are wired in series. For example, power 331 is provided to power the SMA wires 80A, 80B via contact pad 62A. The current flows in direction 332A along SMA wire 80A, into the slide base 60 along current flow direction 332B. The current flows in direction 332C along SMA wire 80B, and into the slide base 60 along current flow direction 332D. Finally, the current flows to contact pad 62B. Therefore, the same current applied to SMA wire 80A is applied to SMA wire 80B. By applying the same current through SMA wires 80A and 80B, more even heat is applied to both wires. Applying more even heat to the SMA wires 80A and 80B reduces the imbalance of force that the buckler actuator applies to the two sides of the lens carriage and reduces dynamic tilt, which leads to better picture quality across all pixels of an image sensor.

Figure 5:
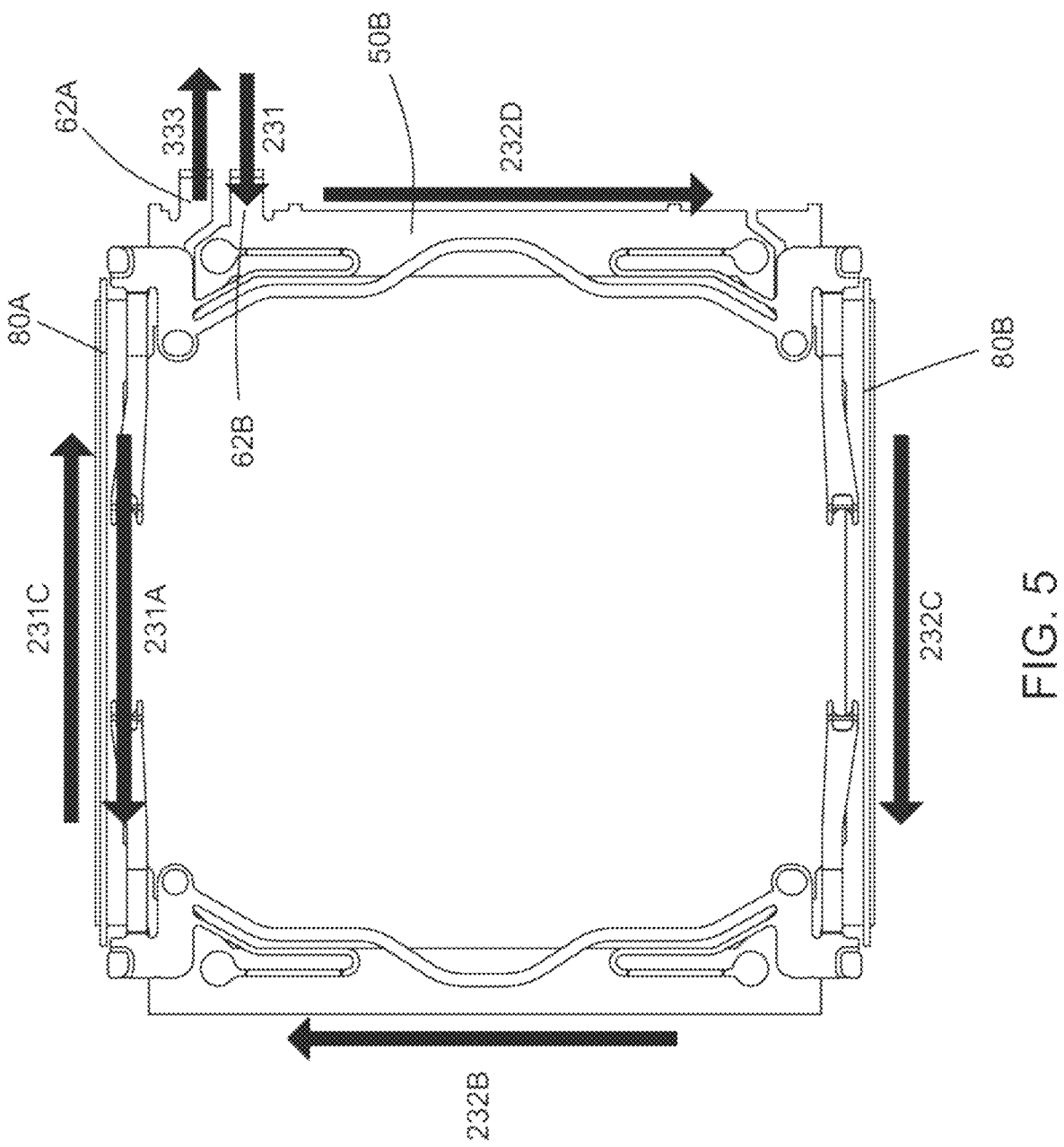
FIG. 5 illustrates a circuit design of the SMA wires of the ball bearing buckle autofocus assembly, according to an example of the disclosure.

FIG. 5 illustrates an exemplary circuit design of the SMA wires 80A and 80B of the assembly 100, according to an example of the disclosure. In some examples, the SMA wires 80A and 80B are wired in parallel. For example, power 231 is provided to power the SMA wires 80A, 80B via contact pad 62B. The current flows in direction 231A along SMA wire 80A, into the slide base 60 along current flow direction 231C. The current also flows in direction 232D into the slide base 60, along SMA wire 80B in direction 232C, SMA wire 80B, in direction 232B and into the slide base 60 along current flow direction 231C. Finally, the current flows to contact pad 62A.

The heat to the SMA wires 80A and 80B depends on the resistance variation due to manufacturing of the SMA wire lengths. Therefore, each side may be pushing the lens carriage 300 at different forces, causing the assembly 100 of FIG. 5 to be more susceptible to tilt variation. However, the ball bearing configuration disclosed herein mitigates this tilt variation such that it is a non-issue.

Figure 6:
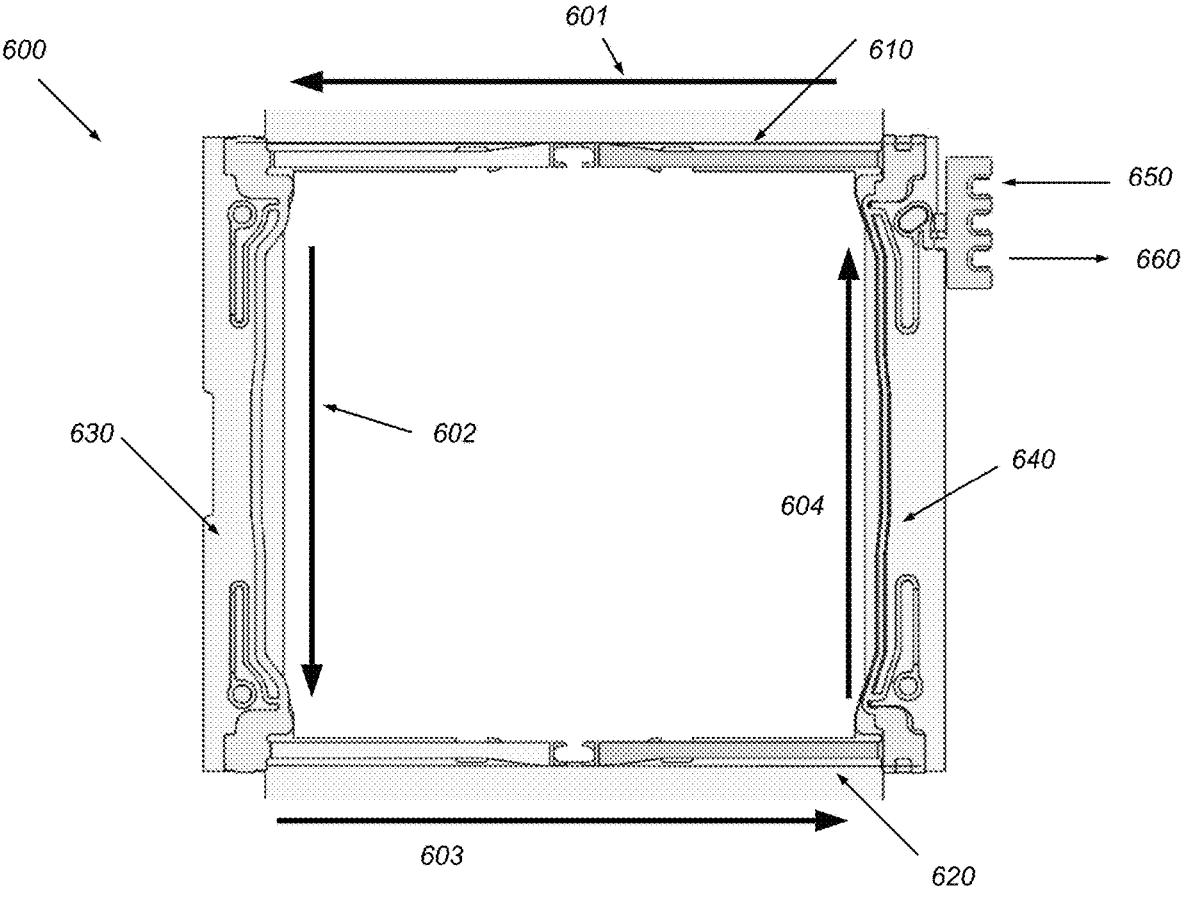
FIG. 6 illustrates an actuator assembly, according to an alternative example of the disclosure.

FIG. 6 illustrates an actuator assembly 600, according to an alternative example of the disclosure. The actuator assembly 600 also includes a first actuator frame 630 and a second sub-assembly 640. The actuator assembly 600 may include a SMA wire 610 and a SMA wire 620. The actuator assembly 600 also includes a power 650 and a ground 660. The actuator assembly 600 may include, but not limited to, buckler actuators, bimorph actuators, and other SMA actuators. In some examples, the actuator assembly 600 is a buckler wire actuator.

The following examples of the disclosure enable optimized current flow through the SMA wires of the actuator assembly 600. The present examples provide at least one isolated conductor circuit with an isolated metal crimp pad to attach the SMA wires in series, which allows for equal current flow through both wires along directions 601-604. This is optimum for achieving equal push force from both sides of the actuator assembly 600 when powered by one source. This is discussed in greater detail below.

Figure 7:
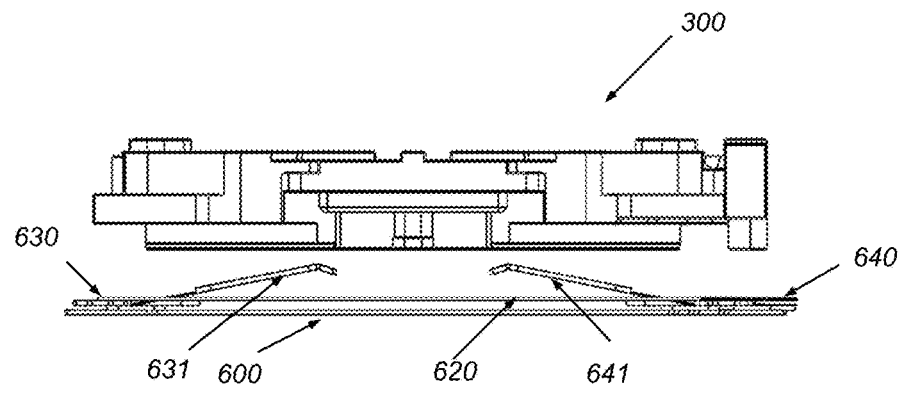
FIG. 7 is a side view of the actuator assembly of FIG. 6 receiving the lens carriage of FIG. 2, according to an example of the disclosure.

FIG. 7 is a side view of the actuator assembly 600 receiving the lens carriage 300, according to an example of the disclosure. An electrical current may be input into SMA wires of the actuator assembly 600 which heat the SMA wires to shrink them which drives the Lens carriage 300 upwards. A spring (not shown) may be provided to return the lens carriage 300 downward.

Figure 8:
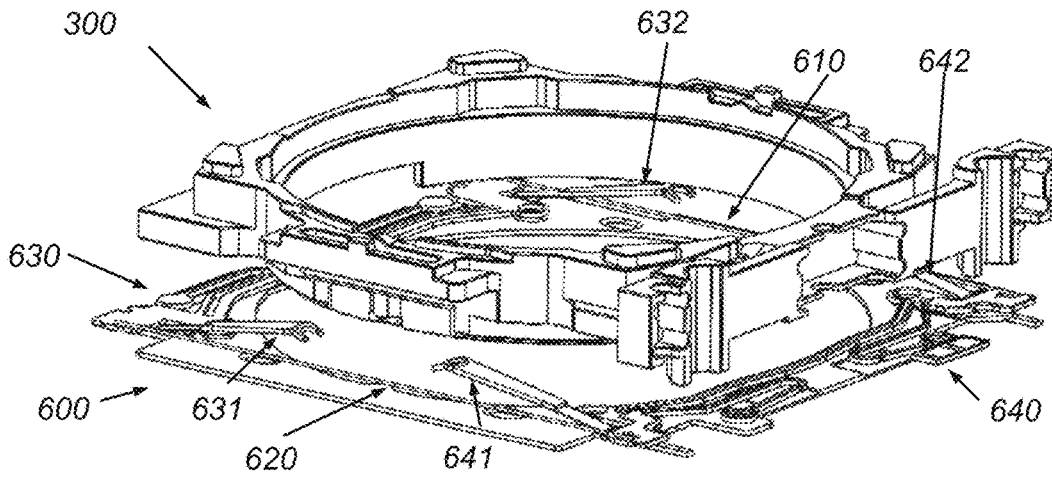
FIG. 8 is an isometric side view of the actuator assembly of FIG. 6 receiving the lens carriage of FIG. 2, according to an example of the disclosure.

FIG. 8 is an isometric side view of the actuator assembly 600 receiving the lens carriage 300, according to an example of the disclosure. The actuator assembly 600 includes a first actuator frame 630 and a second actuator frame 640. In some examples, the first actuator frame 630 and the second actuator frames may be configured as first and second buckler frames, respectively. The first actuator frame 630 includes a first actuator arm 631. In some examples, the first actuator arm 631 may be configured as a first buckler arm. The first actuator arm 631 of the first actuator frame 630 extends towards the second actuator frame 640. The second actuator frame 640 similarly includes a first actuator arm 641. The first actuator arm 641 of the second actuator frame 640 extends towards the first actuator frame 640. The first actuator arms 631, 641 of the first and second actuator frames 630, 640 are connected by a SMA wire 620.

The first actuator frame 630 includes a second actuator arm 632. The second actuator arm 632 may be configured as a second buckler arm. The second actuator arm 632 of the first actuator frame 630 extends towards the second actuator frame 640. The second actuator frame 640 similarly includes a second actuator arm 642. The second actuator arm 642 of the second actuator frame 640 extends towards the first actuator frame 640. The second actuator arms 632, 642 of the first and second actuator frames 630, 640 are connected by a second SMA wire.

The first actuator arms 631, 641 and the second actuator arms 632, 642 of the first and second actuator frames 630, 640 are configured to engage with the lens carriage 300, as described in FIG. 2.

Figure 9:
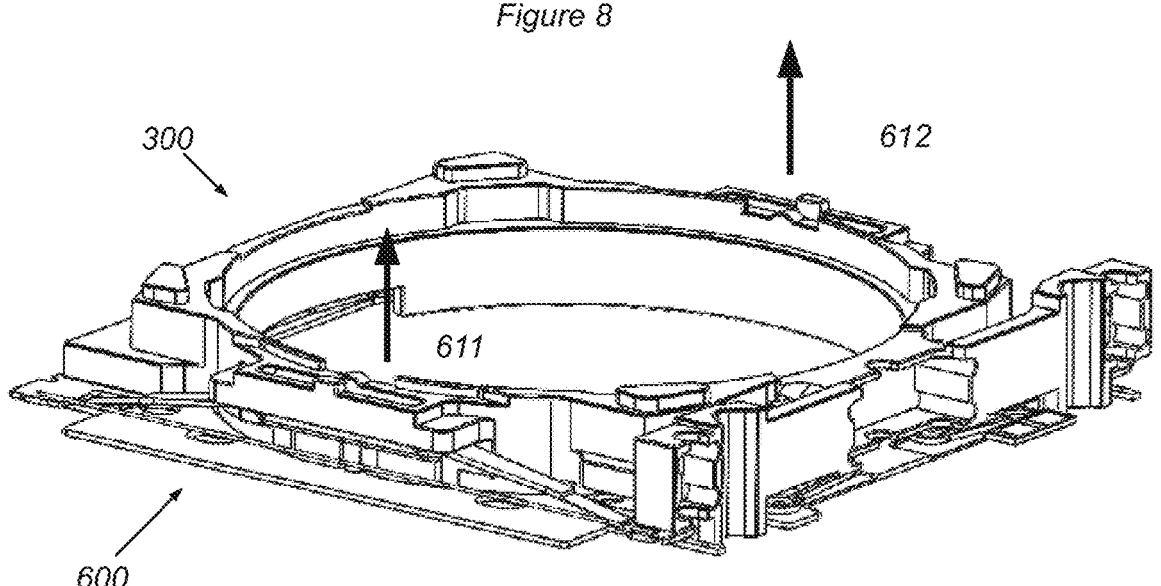
FIG. 9 illustrates a force applied by the actuator assembly of FIG. 6 on the lens carriage of FIG. 2, according to an example of the disclosure.

FIG. 9 illustrates a force applied by the actuator assembly 600 on the lens carriage 300, according to an example of the disclosure. The first actuator arms 631, 641 and the second actuator arms 632, 642 of the actuator assembly 600 apply an upwards force on the lens carriage 300. Specifically, the first actuator arms 631, 641 provides an upward force 611 on the lens carriage 300. Similarly, the second actuator arms 632, 642 provides an upward force 612 on the lens carriage 300. The upward force 611 and the upward force 612 are generated using the SMA wires 620 and 610, respectively. In some examples, the upward force 611 and the upward force 612 are equal.

When the upward forces 611, 612 created by the SMA wires 620 and 610 are not equal too much torque may be generated to induce a tilt of the lens carriage 300, which could lead to image distortion or blur in a captured image.

Figure 10:
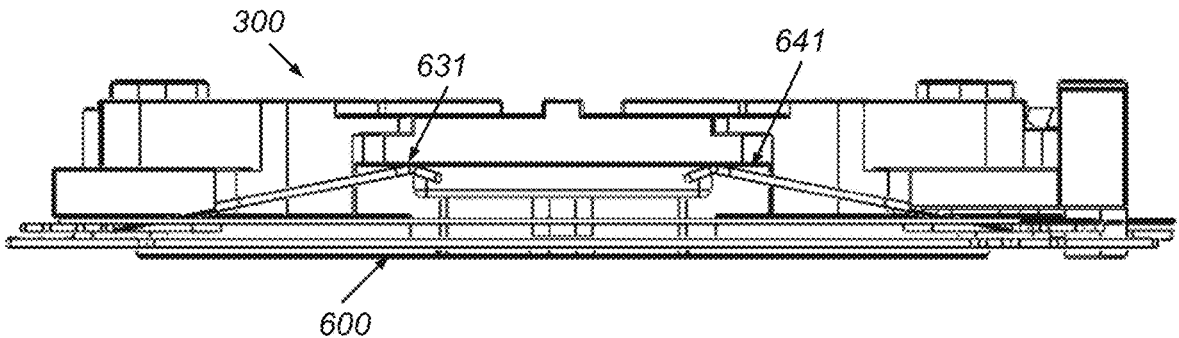
FIG. 10 illustrates the lens carriage of FIG. 2 assembled on the actuator assembly of FIG. 6, according to an example of the disclosure.

FIG. 10 illustrates a side view of the lens carriage 300 assembled with the actuator wire actuator assembly 600. As can be seen, the first actuator arms 631, 641 are in contact with the lens carriage 300.

Figure 11:
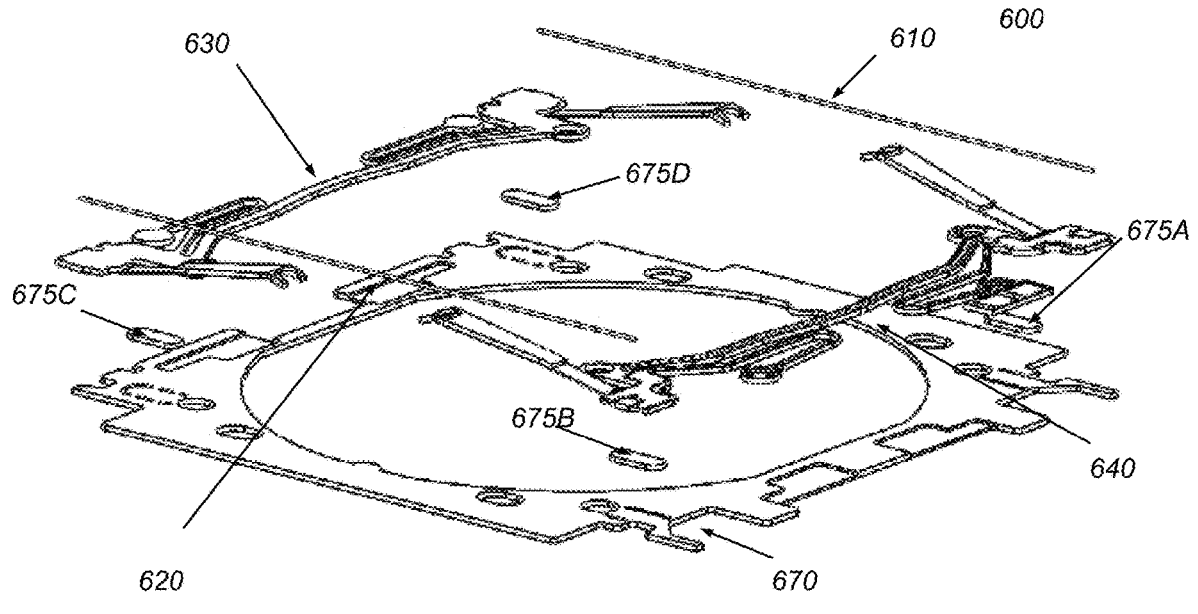
FIG. 11 illustrates an exploded view of the actuator assembly of FIG. 6, according to an example of the disclosure.
Figure 12:
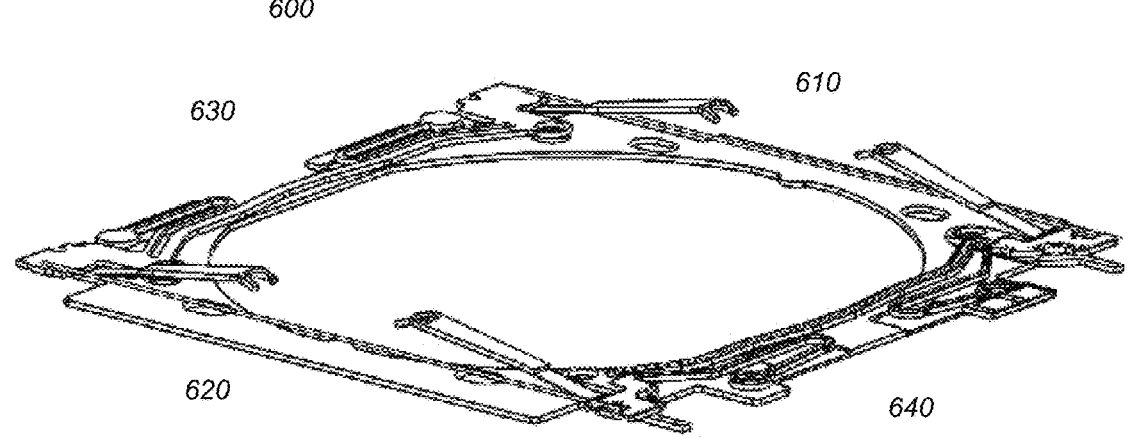
FIG. 12 illustrates an assembled view of the actuator assembly of FIG. 6, according to an example of the disclosure.

FIG. 11 illustrates an exploded view of the actuator wire actuator assembly 600, according to an example of the disclosure. FIG. 12 illustrates an assembled view of the actuator assembly 600, according to an example of the disclosure. The actuator assembly 600 includes the first actuator frame 630, the second actuator frame 640. The actuator assembly 600 also includes a base 670. The base 670 is configured to receive the first actuator frame 630 and the second actuator frame 640, opposite the first actuator frame 630. The actuator assembly 600 also includes SMA wires 620, 610. The actuator assembly 600 also includes flat slide bearings 675A, 675B, 675C, and 675D positioned at each corner of the base 670. Each of the flat slide bearings 675A, 675B, 675C, and 675D are configured to as a machine element that constrains relative motion to only the desired motion and reduces friction between moving parts.

In some examples, the SMA wires 620, 610 are arranged in series to achieve equal current across both wires from one power source. When both the SMA wires 620, 610 receive an equal current the wires undergo equal heat and therefore equal actuation (expansion or contraction). As a result, there is a minimal force bias on each side of actuator. This minimizes lens tilt and less image distortion for the camera image.

In some examples, the first and second actuator frames 630, 640 are made up a unibody metal material. In other examples, the first and second actuator frames 630, 640 are manufactured from a metal material with isolated electrical conductors attached. The isolated electrical conductors are discussed in greater detail.

Figures 13, 14:
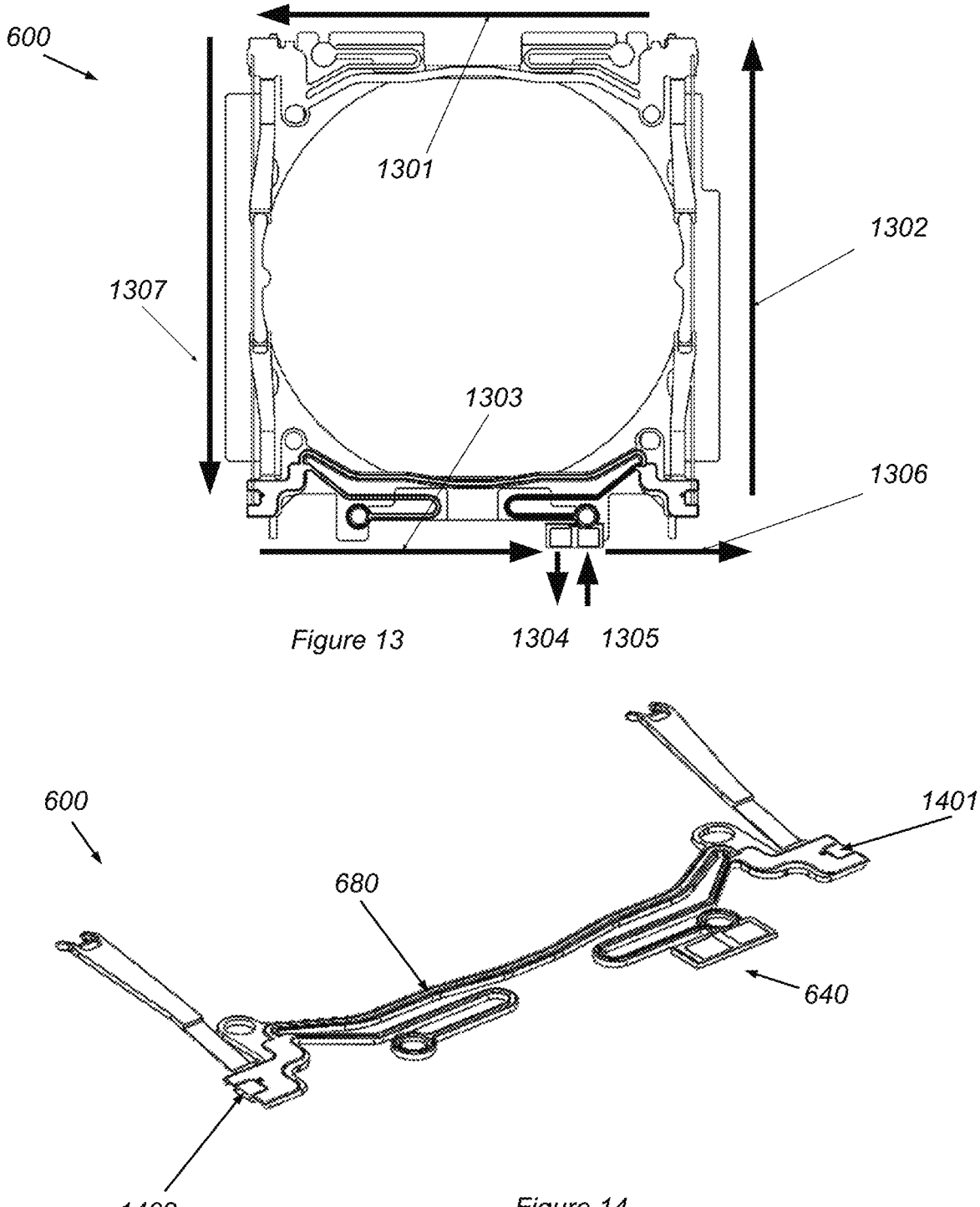
FIG. 13 illustrates a current path across the actuator assembly of FIG. 6, according to an example of the disclosure.
FIG. 14 illustrates a buckler frame and a circuit of the actuator assembly of FIG. 6, according to an example of the disclosure.

FIG. 13 illustrates a current path across the actuator assembly 600, according to an example of the disclosure. Specifically, the current path includes a power input 1305, path 1306 along a first isolated conductor, path 1302 along a first SMA wire, path 1301 along a unibody metal actuator frame, path 1307 along a second SMA wire, path 1303 along a second isolated conductor, and ground output 1304.

Current enters into the actuator assembly 600 at the power input 1305. The current then passes across a first isolated conductor along path 1306, which is electrically connected to the power input 1305. Once the current passes across an isolated conductor along path 1306, the current passes across a first SMA wire along path 1302. The first SMA wire is electrically connected to the first isolated conductor. Once the current passes across the first SMA wire along path 1302, the current passes across the unibody metal actuator frame along path 1301. The first SMA wire is electrically connected to the unibody metal actuator frame. Once the current passes across the unibody metal actuator frame along path 1301, the current passes across the second SMA wire along path 1307. The second SMA wire is also electrically connected to the unibody metal actuator frame. The current then passes across a second isolated conductor along path 1303, which is electrically connected to the second SMA wire. Once the current passes across the second isolated conductor along path 1303, the current passes across the ground output 1304.

As illustrated in FIG. 13, the first and second SMA wires are configured in series to achieve equal current across both wires from one source (i.e., the power input 1305). In some examples, the equal current applied across the first and second SMA wires along paths 1302 and 1307, respectively, amounts to equal heat derived at the first and second SMA wires. In some examples, the minimal force bias on each side of actuator minimizes lens tilt and less image distortion for the camera image. The first actuator frame with path 1301, may be configured as a metal unibody structure. The other Actuator frame is metal with isolated electrical conductors (not shown) attached.

FIG. 14 illustrates a actuator frame 640 and a circuit 680 of the actuator assembly 600, according to an example of the disclosure. In some examples, the actuator frame 640 may be configured as a buckler frame 640. Specifically, FIG. 14 illustrates all layers of the of the actuator frame 640 with the circuit 680. In some examples, a protective cover coat layer may be provided on top of the conductor layer of the circuit 680 (not shown). The actuator frame 640 also includes a first isolated conductor 1401 and a second isolated conductor 1402. The first and second isolated conductors 1401, 1402 may be implemented to accomplish the current path as described in relation to FIG. 13. The first and second isolated conductors 1401, 1402 may include vias down to the isolated metal pads to electrically connect the first and second isolated conductors 1401, 1402 to the first and second SMA wires of FIG. 13. This is discussed in greater detail below with respect to FIG. 18.

In some examples, the first and second SMA wires of FIG. 13 maybe attached to the first and second isolated conductors 1401, 1402, respectively. The first and second SMA wires may be crimped to the first and second isolated conductors 1401, 1402, by resistance weld crimp or mechanical crimp.

Figure 15:
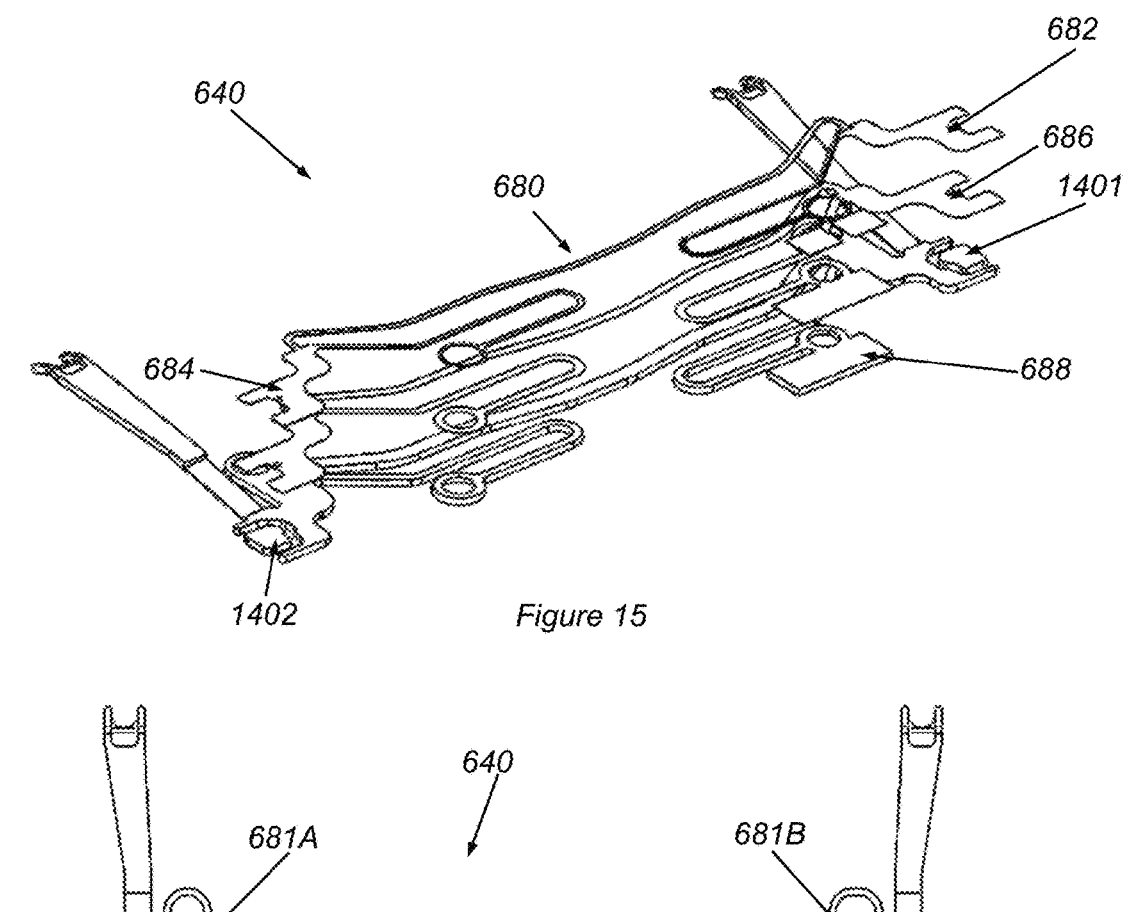
FIG. 15 illustrates an actuator frame with isolated conductors, according to an example of the disclosure.

FIG. 15 illustrates an exploded view of the actuator frame 640 with the first and second isolated conductors 1401, 1402, according to an example of the disclosure. The actuator frame 640 includes a first isolated conductor circuit 682, a second isolated conductor circuit 684 and a metal actuator frame layer 688. In some examples, the metal actuator frame layer 688 may be configured as a metal buckler frame layer. The actuator frame 640 also includes an insulator layer 686 sandwiched between the first and second isolated conductor circuits 682, 684 and the metal actuator frame layer 688. In some examples a protective cover coat layer may be provided on top of the first and second isolated conductors 1401, 1402.

Figure 16:
FIG. 16 illustrates a top view of the actuator frame of FIG. 15, according to an example of the disclosure.

FIG. 16 illustrates a top view of the actuator frame 640, according to an example of the disclosure. The actuator frame 640 may include the first and second isolated conductors 1401, 1402. The actuator frame 640 may include a first via 681B adjacent to the first isolated conductor 1401. Furthermore, the actuator frame 640 may include a second via 681A adjacent to the second isolated conductor 1402. The first and second vias 681B, 681A are vias, or apertures in the insulated layer (686 of FIG. 15) that exposes at least a portion of the isolated metal pad. The actuator frame 640 may also include electrical pads 683A, 683B configured to electrically connect the actuator frame 640 to a power input and ground output (1305 and 1304 in FIG. 13 actuator frame 640.

Figure 17:
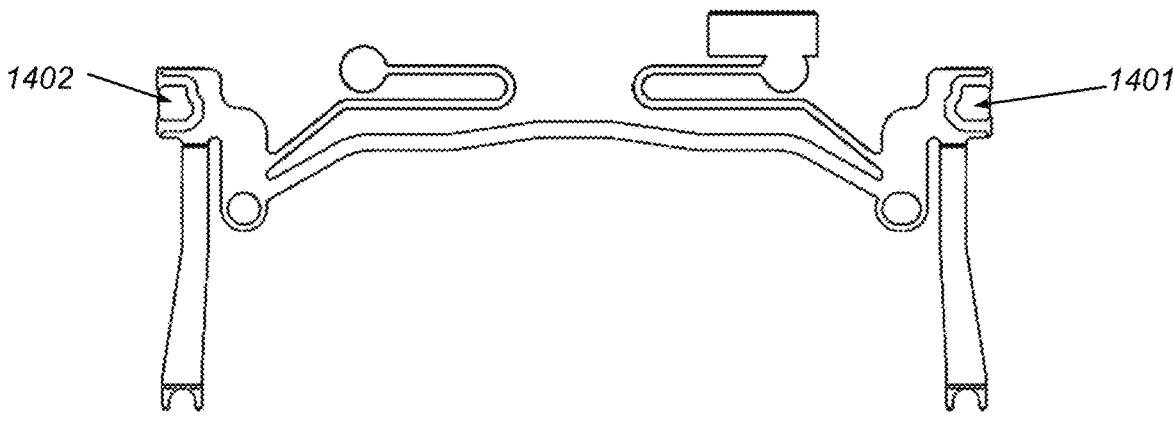
FIG. 17 illustrates a bottom view of the actuator frame of FIG. 15, according to an example of the disclosure.

FIG. 17 illustrates a bottom view of the actuator frame 640, according to an example of the disclosure. The first isolated conductor 1401 is attached to a first SMA wire, as discussed herein. The second isolated conductor 1402 is attached to a second SMA wire, as discussed herein.

Figures 18, 19:
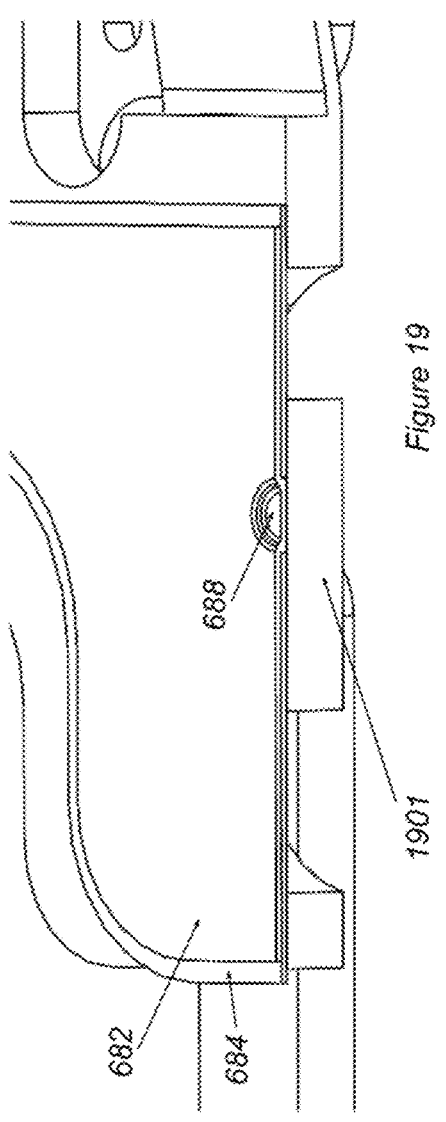
FIG. 18 illustrates an isolated conductor via to isolated metal pad, according to an example of the disclosure.
FIG. 19 illustrates a cross section of the isolated conductor via to metal of FIG. 18, according to an example of the disclosure.

FIG. 18 illustrates the second actuator frame 640 similarly includes a second actuator arm 642. In some examples, the second actuator arm 642 may be configured as a second buckler arm. FIG. 18 also illustrates an isolated conductor via 688, according to an example of the disclosure. FIG. 18 also illustrates the SMA wire 610 attached to the isolated conductor 1939 using an SMA wire crimp 1801. Thus, in some examples, the isolated conductor 1939 is the connection joint or crimp location to the SMA wire 610. In some examples, the SMA wire crimp 1801 can be configured as a resistance weld or a mechanical fold over crimp.

FIG. 19 illustrates a cross section of the isolated conductor via 688 to the isolated metal pad, according to an example of the disclosure. The via extends through the conductor layer 1940, the insulator layer 1941, and to the metal pad layer 1901.

Figure 20:
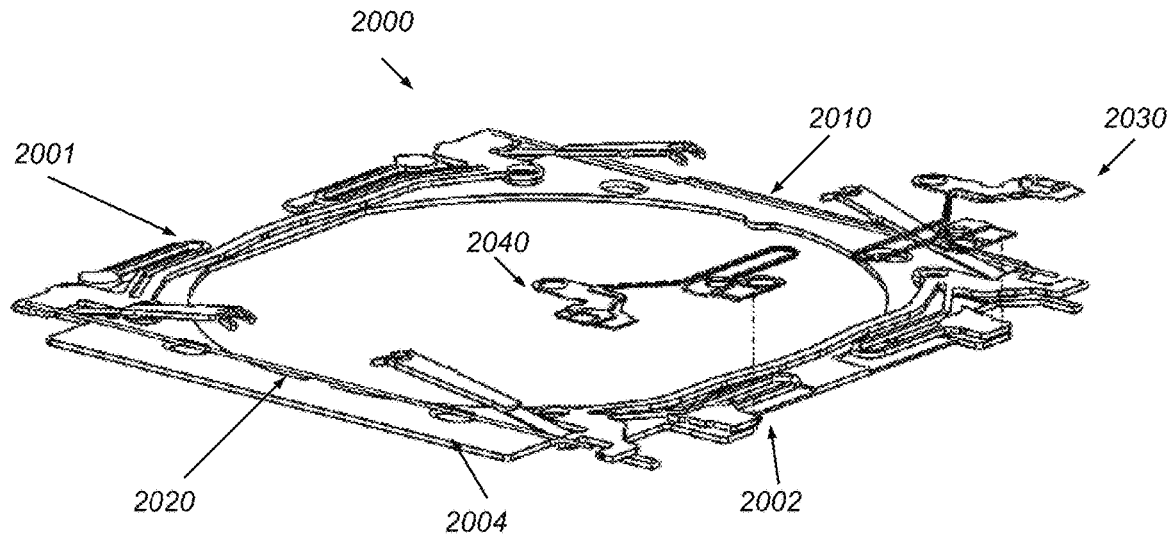
FIG. 20 illustrates a modular circuit assembly, according to an example of the disclosure.
Figure 21:
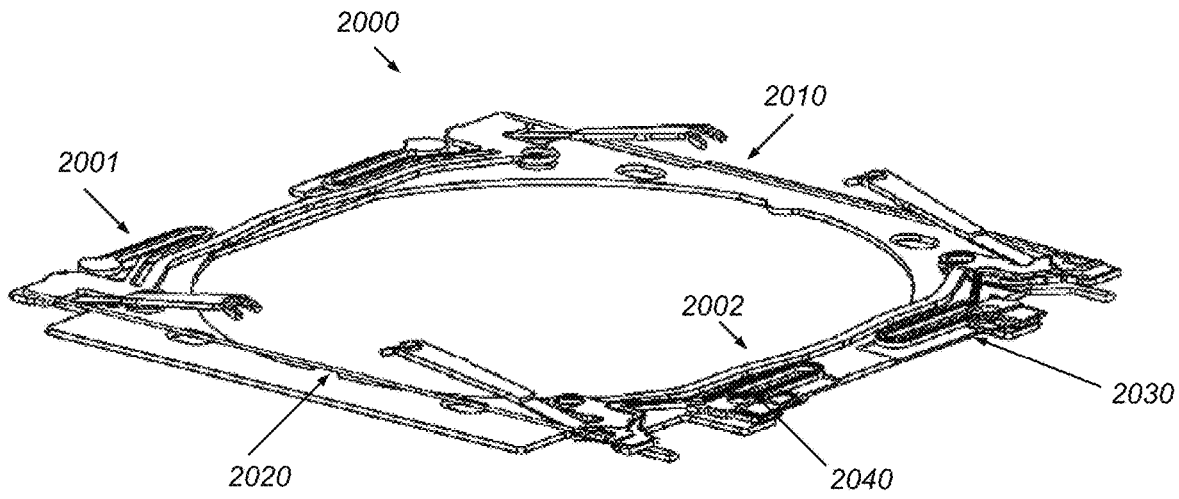
FIG. 21 illustrates a modular circuit assembly, according to an example of the disclosure.

FIG. 20 illustrates a modular bucker circuit assembly 2000, according to an example of the disclosure. FIG. 21 illustrates a modular bucker circuit assembly 2000. The modular bucker circuit assembly 2000 includes a first actuator frame 2001 and a second actuator frame 2002. In some examples, the first actuator frame 2001 and the second actuator frame 2002 may be configured as a first and second buckler frames, respectively. The modular bucker circuit assembly 2000 also includes a metal base 2004 to which the first and second actuator frames 2001, 2002 are attached. The modular bucker circuit assembly 2000 also includes a first SMA wire 2010, and a second SMA wire 2020. The modular bucker circuit assembly 2000 also includes a first actuator circuit 2030 and a second actuator circuit 2040 configured to be attached and actuate the second actuator frame 2002. In some examples, the first actuator circuit 2030 and the second actuator circuit 2040 may be configured as first and second buckler circuits, respectively. The first actuator frame 2001 may also include a first and second actuator circuit (not shown) configured to be attached and actuate the first actuator frame 2001.

Figures 22A, 22B, 23:
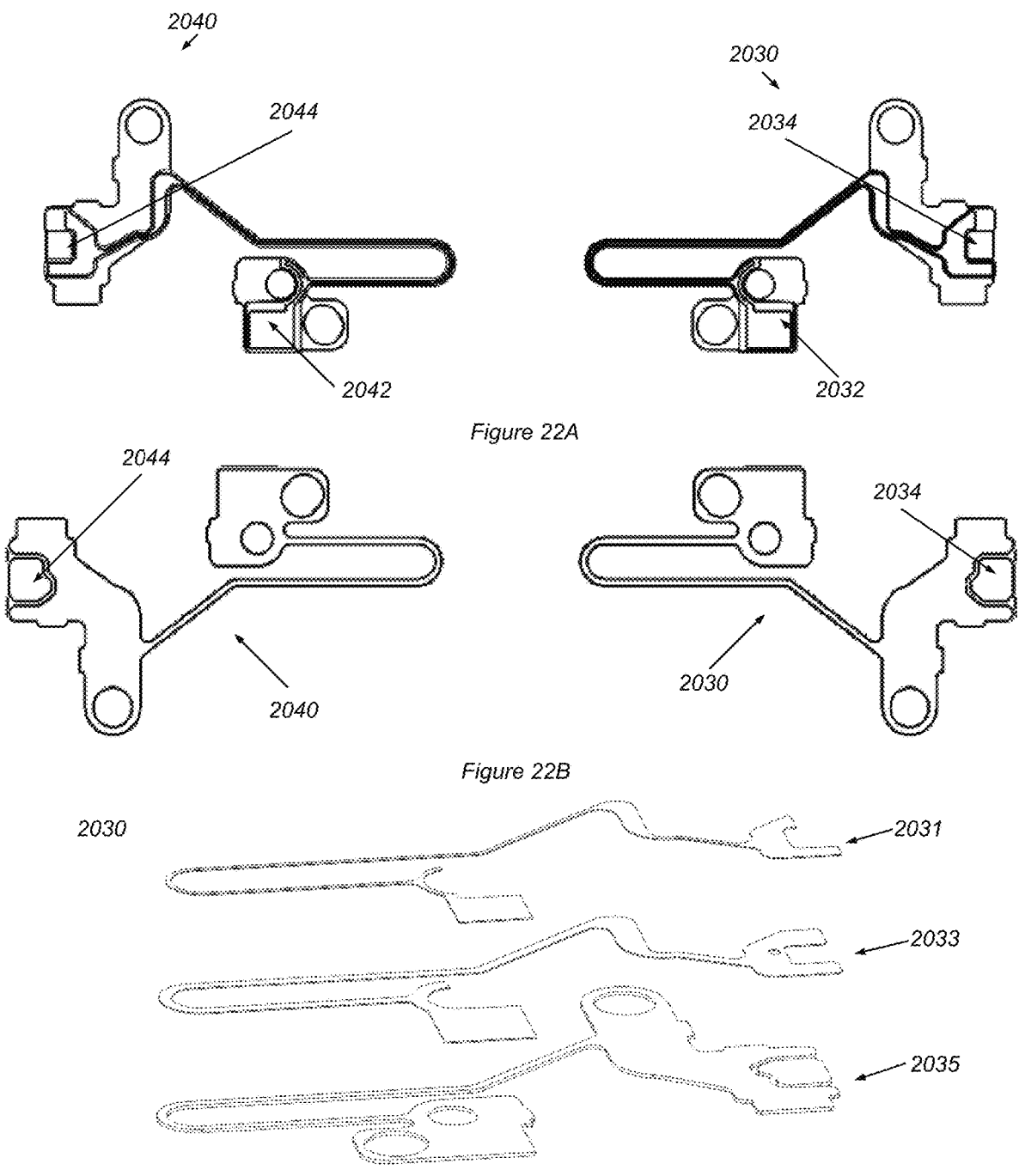
FIG. 22A illustrates modular circuits of the modular circuit assembly, according to an example of the disclosure.
FIG. 22B illustrates an under view of the modular circuits of the modular circuit assembly, according to an example of the disclosure.
FIG. 23 illustrates an exploded view of the multiple circuit layers of the modular circuit assembly, according to an example of the disclosure.

FIG. 22A illustrates the first and second modular actuator circuits 2030 and 2040 of the modular bucker circuit assembly, according to an example of the disclosure. FIG. 22B illustrates an under view of the first and second modular actuator circuits 2030 and 2040, according to an example of the disclosure. The first modular actuator circuit 2030 may include an isolated metal pad 2034 for attaching to an SMA wire (not shown). The isolated metal pad 2034 may be made of steel or any other types of suitable metals. The first modular actuator circuit 2030 may also include an electrical pad 2032. The second modular actuator circuit 2040 may include an isolated metal pad 2044 for attaching to an SMA wire (not shown). The isolated metal pad 2044 may be made of steel or any other types of suitable metals. The second modular actuator circuit 2040 may also include an electrical pad 2042.

The first and second modular actuator circuits 2030 and 2040 enable a higher panel density of the modular bucker circuit assembly. The first and second modular actuator circuits 2030 and 2040 also enable the same modular circuit components to be manufactured and provided on various camera sizes without circuit redesign or rebuild. Furthermore, the first and second modular actuator circuits 2030 and 2040 are configured to attach to actuator frames with a unibody metal composition. In some examples, the first and second modular actuator circuits 2030 and 2040 have isolated metal pads 2034, 2044 to crimp the SMA wire to (resistance weld or fold over crimp). While two modular actuator circuits are illustrated herein, the actuator frames may be attached to a single modular circuit design.

Figure 24:
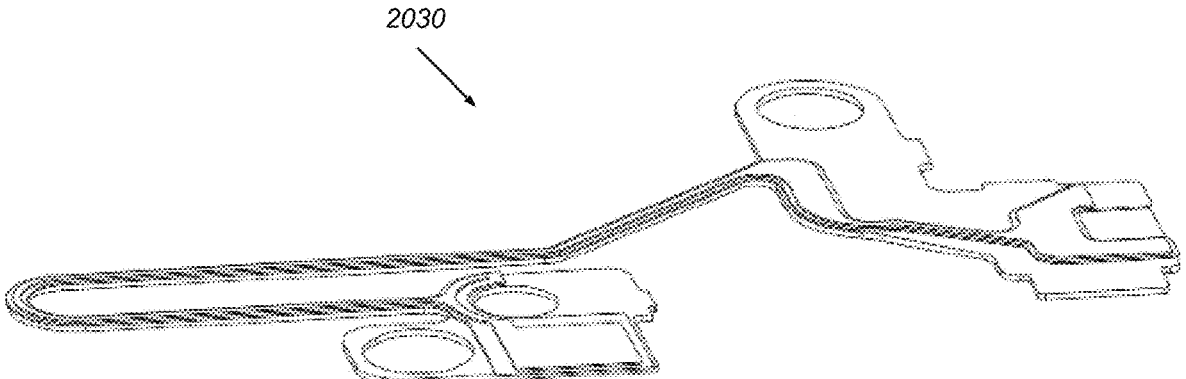
FIG. 24 illustrates an assembled view of the multiple circuit layers of the modular circuit assembly, according to an example of the disclosure.

FIG. 23 illustrates an exploded view of the multiple circuit layers of the first modular actuator circuit 2030, according to an example of the disclosure. FIG. 24 illustrates an assembled view of the multiple circuit layers of the first modular actuator circuit 2030, according to an example of the disclosure. The first modular buckler circuit 2030 includes an isolated conductor layer 2031, an insulator layer 2033, and a metal layer 2035. The first modular buckler circuit 2030 also includes an isolated metal pad 2037 for attaching to an SMA wire (not shown).

The isolated conductor layer 2031 may be connected directly to the isolated metal pad 2037. For example, the isolated conductor layer 2031 can be directly plated down to the isolated metal pad 2037. In other examples, the isolated conductor layer 2031 can be soldered to the isolated metal pad 2037. In alternative examples, conductive epoxy may be applied between the isolated conductor layer 2031 and the isolated metal pad 2037. In some alternative examples, the isolated conductor layer 2031 can be laser or resistance welded to the isolated metal pad 2037.

The insulator layer 2033 may be connected directly to the metal layer 2035. For example, the insulator layer 2033 can be formed on top of the metal layer 2035 followed by the isolated conductor layer 2031 and cover coat layers; each layer formed in an additive process. In some alternative examples of the disclosure, the insulator layer 2033 can be glued to the metal layer 2035 in at least one location. In some alternative examples, the insulator layer 2033, the isolated conductor layer 2031 and the cover coat layer(s) can be built as separate flexible circuit components and glued to the metal layer 2035.

Both the actuator assembly 600 with isolated conductors (of FIG. 13) and the modular bucker circuit assembly 2000 (of FIG. 20) enable attaching the two SMA wires in series to minimize force difference between the wires when driven by a single source. The modular bucker circuit assembly 2000 is a more compact circuit design which doesn't need to change in size when being implemented within various size camera platforms. In some examples, the isolated metal pad acts as a connection point between the isolated circuit and the SMA wire. This isolated metal pad is rigidly connected to the metal Actuator frame due to high pull forces of the SMA wire. Thus, in some examples, the isolated metal pad is formed as a crimp to the SMA wire.

Both the actuator assembly 600 with isolated conductors (of FIG. 13) and the modular bucker circuit assembly 2000 (of FIG. 20) can be built using additive circuit technology. For example, an insulator layer is formed on top of a metal layer with conductive material formed on top of the insulator followed by a protective cover coat. In some alternative examples, the insulator layer, conductor layer, and cover coat layer(s) may be formed separately and then attached to the metal layer using an adhesive.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Additionally, the techniques described herein could be used to make a device having two, three, four, five, six, or more generally n number of bimorph actuators and buckle actuators. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A buckler wire actuator assembly comprising:
a first buckler frame mounted onto a first side of a base of the buckler wire actuator assembly and including:
a first isolated conductor circuit, a second isolated conductor circuit, and a first insulator layer disposed between and electrically isolating the first isolated conductor circuit and the second isolated conductor circuit;
a first SMA wire in electrical connection to a first isolated electrical conductor electrically connected to the first isolated conductor circuit at a first end of the first SMA wire; and
a second SMA wire opposite the first SMA wire, the second SMA wire in electrical connection to the second isolated electrical conductor at a first end of the second SMA wire;
a first pair of actuator arms that include a fixed end that are connected to the first isolated electrical conductor and the second isolated electrical conductor, respectively; and
a second buckler frame mounted onto a second side of the base, the second buckler frame including:
a third isolated conductor circuit, a fourth isolated conductor circuit, and a second insulator layer disposed between and electrically isolating the third isolated conductor circuit and the fourth isolated conductor circuit, a third isolated electrical conductor electrically connected to the third isolated conductor circuit, and a fourth isolated electrical conductor electrically connected to the fourth isolated conductor circuit; and
a second pair of actuator arms that include a fixed end that are connected to the third isolated electrical conductor and the fourth isolated electrical conductor, respectively, wherein the first and second SMA wires are arranged in series to enable both the first and second SMA wires to receive equal current from a current input.

2. The buckler wire actuator assembly of claim 1, wherein the second buckler frame comprises a unibody metal material in electrical connection with the first and second SMA wires.

3. The buckler wire actuator assembly of claim 1, further comprising at least one flat slide bearings positioned at each corner of the base and each configured to constrain relative motion and reduce friction between moving components.

4. The buckler wire actuator assembly of claim 1, wherein the second SMA wire is crimped to the second isolated conductor using at least one of a resistance weld crimp or mechanical crimp.

5. The buckler wire actuator assembly of claim 1, wherein an electrical current passes across the second isolated conductor of the first buckler frame to a ground output.

6. The buckler wire actuator assembly of claim 1, wherein the current input is configured to receive an electrical current, which passes across the first isolated electrical conductor to the first SMA wire.

7. The buckler wire actuator assembly of claim 1, wherein the first SMA wire is crimped to one of the first isolated electrical conductor using at least one of a resistance weld crimp or mechanical crimp.

8. The buckler wire actuator assembly of claim 1, wherein the first buckler frame includes at least one electrical via through the first insulating layer to the first isolated electrical conductor.

9. The buckler wire actuator assembly of claim 1, wherein the first buckler frame includes a protective cover coat layer provided on the first isolated conductor circuit.

10. The buckler wire actuator assembly of claim 1, wherein the first buckler frame further includes a first electrical via adjacent to the first isolated conductor and a second via adjacent to the second isolated conductor.

11. A buckler wire actuator assembly comprising:
a first buckler frame mounted onto a first side of a base of the buckler wire actuator assembly, the first buckler frame including a first isolated conductor circuit, a second isolated conductor circuit, and a first insulator layer disposed between and electrically isolating the first isolated conductor circuit and the second isolated conductor circuit;
a first SMA wire in electrical connection to the first isolated conductor circuit; and
a second SMA wire opposite the first SMA wire and electrically connected to the second isolated conductor circuit,
wherein the first and second SMA wires are arranged in series to enable both the first and second SMA wires to receive equal current from a current input.

12. The buckler wire actuator assembly of claim 11, wherein the first buckler frame includes at least one isolated electrical conductor.

13. The buckler wire actuator assembly of claim 12, wherein the first SMA wire is in electrical connection to a first isolated electrical conductor in electrical contact with the first isolated conductor circuit.

14. The buckler wire actuator assembly of claim 13, wherein the first SMA wire is crimped to the first isolated electrical conductor using at least one of a resistance weld crimp or mechanical crimp.

15. The buckler wire actuator assembly of claim 11, further comprising a second buckler frame mounted onto a second side of the base of the buckler wire actuator assembly, opposite the first buckler frame, wherein the second buckler frame includes:
a third isolated conductor circuit, a fourth isolated conductor circuit, and a second insulator layer disposed between and electrically isolating the third isolated conductor circuit and the fourth isolated conductor circuit; and
a second pair of actuator arms that include a fixed end that are connected to the third isolated electrical conductor circuit and the fourth isolated electrical conductor circuit, respectively.

16. The buckler wire actuator assembly of claim 11, wherein the second SMA wire is crimped to a second isolated conductor using at least one of a resistance weld crimp or a mechanical crimp.

* * * * *